United States Patent

Brown

[15] 3,703,782
[45] Nov. 28, 1972

[54] PRESSURE SENSITIVE APPARATUS

[72] Inventor: William B. Brown, 522 West 39th Street, Topeka, Kans. 66609

[22] Filed: Feb. 4, 1971

[21] Appl. No.: 112,607

[52] U.S. Cl. ..................................43/23, 9/9, 43/25, 116/124 B
[51] Int. Cl. ..........................A01k 87/00, B63c 7/26
[58] Field of Search...........43/23, 25; 116/70, 124 B; 9/9

[56] References Cited

UNITED STATES PATENTS

| 2,190,531 | 2/1940 | Kaboskey et al. | 43/25 |
| 2,479,021 | 8/1949 | Perkins | 9/9 |
| 2,528,799 | 11/1950 | Strone | 43/25 X |
| 2,642,693 | 6/1953 | Broady | 43/23 |
| 2,687,541 | 8/1954 | Bannister | 43/25 X |
| 2,820,971 | 1/1958 | Welsh et al. | 9/9 |

FOREIGN PATENTS OR APPLICATIONS

| 485,006 | 7/1952 | Canada | 43/25 |
| 552,898 | 2/1958 | Canada | 43/25 |

*Primary Examiner*—Samuel Koren
*Assistant Examiner*—Daniel J. Leach
*Attorney*—Norman G. Steanson, Jr.

[57] ABSTRACT

A housing having a housing open end is provided. A hollow member having a hollow member opening is slidably positioned in the housing with the hollow member opening facing the housing open end. A resilient diaphragm is mounted over the hollow member opening. A pin is mounted to the resilient diaphragm. A pin guide having a pin guide hole is slidably positioned in the housing so that the pin projects through the pin guide hole. A first strand loop and second strand loop are mounted oppositely to the housing and snugly looped over the part of the pin projecting from the pin guide hole. A biasing means is provided for urging the hollow member toward the housing open end. The biasing means can be liquid pressure as when the pressure sensitive apparatus is submerged upright in liquid, gravity when the housing open end is pointed downwardly or a spring. In operation, when the ambient pressure sufficiently exceeds the pressure in the hollow member, the diaphragm and pin move into the hollow member. When the pin moves below the surface of the pin guide the first strand loop and second strand loop slip off the pin and allow the hollow member to be urged out of the housing. A locating strand can be mounted at opposite ends to the hollow member and housing or spring. Thus, a means of detecting pressure changes and locating apparatus is provided.

32 Claims, 8 Drawing Figures

INVENTOR.
WILLIAM B. BROWN
BY
Norman G. Steanson Jr.
ATTORNEY

INVENTOR.
WILLIAM B. BROWN

BY Norman G. Steanson Jr.

ATTORNEY

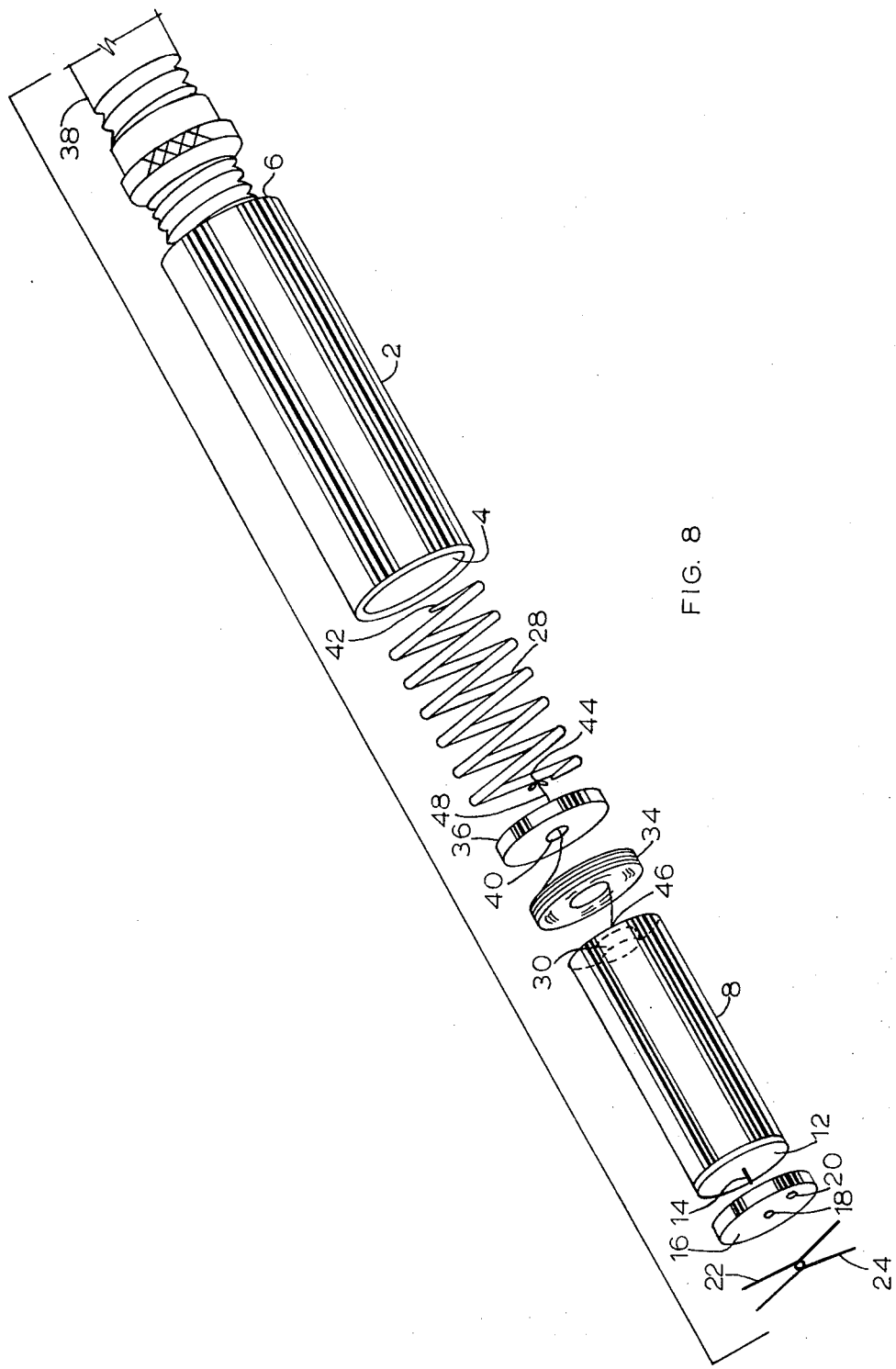

3,703,782

PRESSURE SENSITIVE APPARATUS

SUMMARY OF THE INVENTION

A housing having a housing open end is provided. A hollow member having a hollow member opening is slidably positioned in the housing with the hollow member opening facing the housing open end. The housing and hollow member can be any desired shape as long as the hollow member is slidably movable in the housing. A resilient diaphragm is mounted over the hollow member opening. A pin is mounted to the resilient diaphragm. A pin guide having a pin guide hole is slidably positioned in the housing so that the pin projects through the pin guide hole. A first strand loop and second strand loop are mounted oppositely to the housing and are snugly looped over the part of the pin projecting through the pin guide hole. A biasing means is provided for urging the hollow member toward the housing open end. The biasing means can be liquid pressure as when the pressure sensitive apparatus is submerged in a liquid, or gravity when the housing open end is pointed downwardly, or a spring. In operation, when the ambient pressure sufficiently exceeds the pressure inside the hollow member, as by submerging the pressure sensitive apparatus in liquid or by increasing the ambient gas pressure or both, the resilient member and pin move into the hollow member. When the pin moves below the surface of the pin guide the first strand loop and second strand loop slip off the pin. The biasing means can now urge the hollow member out of the housing open end. If desired, a locating strand can be mounted at opposite ends to the hollow member and housing or spring so that the free floating hollow member can be used to locate a submerged housing. The movement of the hollow member can be utilized for any desired purpose as, for example, to detect pressure changes or to open or close an electrical switch.

An object of this invention is to provide an apparatus for detecting pressure changes in liquids and gases.

Another object of this invention is to provide a cheap and simple method of detecting pressure changes in liquids and gases.

Another object of this invention is to provide a pressure sensitive apparatus that is adjustable to actuate at different pressures.

Another object of this invention is to provide a pressure sensitive apparatus that is reusable.

Another object of this invention is to provide a pressure sensitive apparatus that can provide gross movement with relatively small pressure changes.

Another object of this invention is to provide a pressure sensitive apparatus that provides gross movement with relatively small changes in pressures that can be used as desired, as for example, to open or close an electrical switch.

Another object of this invention is to provide a pressure sensitive apparatus that can be used to locate an object dropped in liquid such as a fishing rod or outboard motor dropped in water.

Another object of this invention is to provide a pressure sensitive apparatus that can be used on any object.

BRIEF DESCRIPTION OF THE DRAWINGS

Referring to the drawings:

FIG. 8 is an exploded perspective view of the pressure sensitive apparatus mounted as a handle of a fishing rod as shown in FIG. 7.

DESCRIPTION OF THE PREFERRED EMBODIMENT

Figure 1:
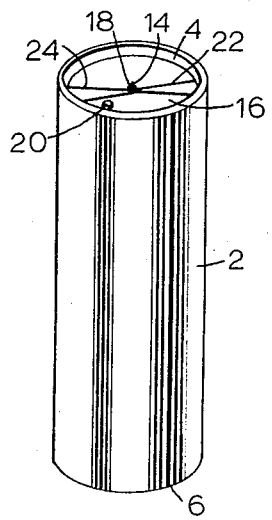
FIG. 1 is a perspective view of a basic pressure sensitive apparatus.
Figure 2:
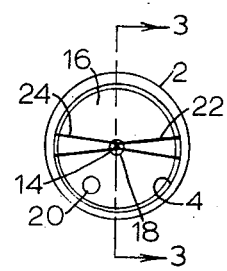
FIG. 2 is a top view of a basic pressure sensitive apparatus.
Figure 3:
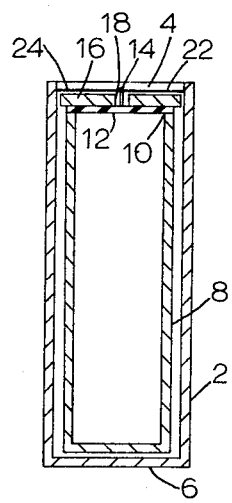
FIG. 3 is a sectional view taken along line 3—3 of FIG. 2.

Referring to FIG. 1, FIG. 2 and FIG. 3 a basic pressure sensitive apparatus is shown. A housing 2 is provided having a housing open end 4 and a housing closed end 6. A hollow member 8 having a hollow member opening 10 is slidably positioned in the housing 2 with the hollow member opening 10 facing the housing open end 4. The housing 2 and hollow member 8 are shown having a circular cross section but could be any shape desired, as for example, square in cross section. A resilient diaphragm 12 is mounted over the hollow member opening 10 as by bonding. Rubber has been found to work very well for the resilient diaphragm 12. A pin 14 is mounted to the resilient diaphragm 12. The pin 14 can be mounted to resilient diaphragm 12 as by bonding or as by molding the pin 14 in the resilient diaphragm 12. The pin 14 is preferably centered in the resilient diaphragm 12, but need not be. A pin guide 16 having a pin guide hole 18 and a pressure hole 20 is positioned in the housing 2 with the pin 14 projecting through the pin guide hole 18. The pressure hole 20 allows ambient pressure to reach the resilient diaphragm 12 easily although the ambient pressure can reach the resilient diaphragm 12 between the inside of the housing 2 and the edge of the pin guide 16 and between the resilient diaphragm 12 and the pin guide 16. Ambient pressure can also reach the resilient diaphragm 12 through the pin guide hole 18. A first strand loop 22 and second strand loop 24 are mounted oppositely on the housing open end 4 as by bonding and looped snugly over the pin 14 projecting through the pin guide hole 18. Only the first strand loop 22 is required, but using the first strand loop 22 and second strand loop 24 tends to keep the pin 14 centered in the pin guide hole 18 and not tilted against the sides of the pin guide hole 18.

In operation, if the basic pressure sensitive apparatus is submerged upright in a liquid the hollow member 8 will tend to float and the hollow member 8 will be urged against the pin guide 16 and the pin guide 16 will be urged against first strand loop 22 and second strand loop 24. When the ambient liquid pressure reaches sufficient pressure, the resilient diaphragm 12 and pin 14 will move into the hollow member 8. When the pin 14 moves beneath the outside surface of the pin guide 16, the first strand loop 22 and second strand loop 24 will slip off the pin 14 and allow the hollow member 8 to float out of the housing 2 and to the surface of the liquid. Thus, a means is provided for determining when a certain ambient liquid pressure is reached. Or, the movement of the hollow member 8 could be used as desired, as for example, to open or close an electrical switch.

The pressure at which the hollow member 8 is released can be determined by varying the parameters of the pressure sensitive apparatus such as the pressure and temperature of the gas in the hollow member 8, the resilience of the resilient diaphragm 12, the length of the pin 14, the depth of the pin guide hole 18 and the relative size of the hollow member opening 10 and the hollow member 8.

For using the basic pressure sensitive apparatus in an ambient medium of gas, the housing open end 4 is positioned downwardly and the biasing means is gravity rather than liquid pressure. Otherwise, the pressure sensitive apparatus works as described above in a liquid. When the ambient gas pressure reaches the pressure determined by construction of the pressure sensitive apparatus, the hollow member 8 can fall out of the housing 2 to indicate that certain pressure has been obtained or to be otherwise utilized, as to operate an electrical switch.

Figure 4:
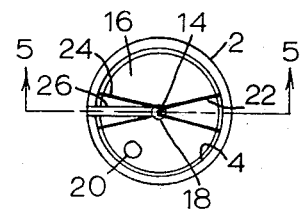
FIG. 4 is a top view of a pressure sensitive apparatus having a biasing spring, stop, and breathing plug.
Figure 5:
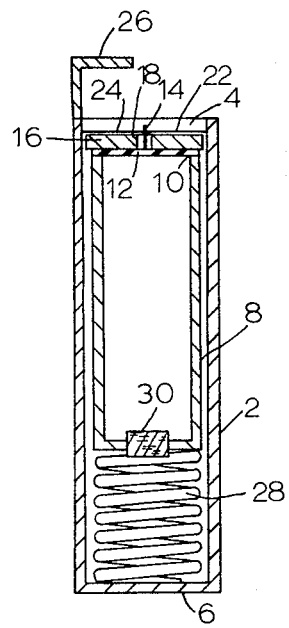
FIG. 5 is a sectional view taken along line 5—5 of FIG. 4.
Figure 6:
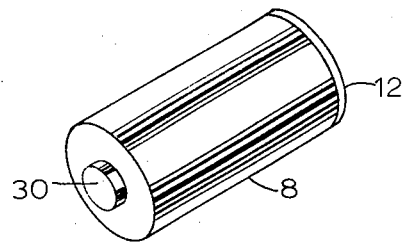
FIG. 6 is a perspective view of the hollow member with breathing plug.

FIG. 4, FIG. 5 and FIG. 6 show a modification of the pressure sensitive apparatus which has three additional members, a stop 26, a biasing spring 28 and a breathing plug 30. It should be noted that the same element is given the same number in all FIGS. even though the element, such as the housing 2 may vary somewhat in dimensions and shape from FIG. to FIG. This is thought to make the invention easier to understand. The stop 26 is mounted to the housing open end 4 and extends up and over the housing open end 4 to limit the movement of the hollow member 8 when it is desired to do so. The biasing spring 28 is positioned between the housing closed end 6 and the hollow member 8 and urges the hollow member 8 toward the housing open end 4 regardless of the position of the pressure sensitive apparatus and regardless of whether the pressure sensitive apparatus is in a gas or liquid medium. A breathing plug 30 is mounted in the hollow member 8. The breathing plug 30 is made of a material that allows the inside gas pressure of the hollow member 8 to adjust to the ambient gas pressure substantially slowly but not rapidly. The breathing plug 30 allows gas to move slowly through the breathing plug 30 to slowly but not rapidly equalize the pressure in the hollow member 8 and the ambient gas pressure when the pressure sensitive apparatus is used in a gas medium. The breathing plug 30 is used when it is only desired to actuate the pressure sensitive apparatus upon sudden changes in ambient pressure, but not slow changes in ambient pressure, as for example, when the pressure sensitive apparatus is dropped from air into water or when a pressure vessel explodes. Cork has been found to work well as the material used in making the breathing plug 30. Thus a pressure sensitive apparatus is provided that will operate in any medium, in any position and only upon sudden changes in ambient pressure if desired. Of course, the stop 26, biasing spring 28 and breathing plug 30 can be used singly or in any desired combination on the basic pressure sensitive apparatus.

Figure 7:
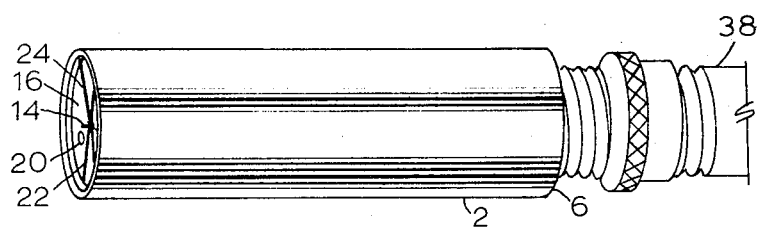
FIG. 7 is a perspective view of a pressure sensitive apparatus mounted as the handle of a fishing rod.

FIG. 7 and FIG. 8 show a pressure sensitive apparatus without stop 26 and having the additional elements of a roll of locating strand 34 and a separator 36. In addition, the housing 2 is mounted to and serves as the handle of a fishing rod 38. In this modification, the biasing spring first end 42 is mounted to the housing closed end 6 as by welding. A separator 36 having a separator hole 40 is positioned in the housing 2 acting as the fishing rod handle and is abutting the biasing spring second end 44. A roll of locating strand 34 is positioned in the housing 2 acting as a fishing rod handle between the hollow member 8 and the separator 36. The locating strand first end 46 is connected as by bonding to the hollow member 8 and the locating strand second end 48 is connected, as by tying, to the biasing spring second end 44. If desired, the locating strand second end 48 could be connected to the housing 2. The locating strand 34 is rolled up in a manner that allows the locating strand 34 to play out when desired. The locating strand second end 48 goes through the separator hole 40. The separator 36 prevents the locating strand 34 from getting tangled in the biasing spring second end 44. The pressure sensitive apparatus shown in FIG. 8 is assembled as the pressure sensitive apparatus shown in FIG. 5 only without the stop 26 and with the locating strand 34 and separator 36. The breathing plug 30 allows the hollow member 8 to remain essentially at ambient air pressure. If the fishing rod 38 is dropped accidentally into the water, when the fishing rod 38 reaches sufficient depth the liquid pressure will cause the resilient diaphragm 12 and pin 14 to move into the hollow member 8, causing the first strand loop 22 and second strand loop 24 to slip off the pin 14. The biasing spring 28 can then eject the pin guide 16, hollow member 8, locating strand 34 and separator 36 into the water. The hollow member 8 then floats to the surface of the water, unwinding the locating strand 34. The locating strand second end 48 remains tied to the biasing spring second end 44 in the dropped fishing rod 38. Then all that is necessary to do to recover the lost fishing rod 38 is to pull in the locating strand 34. Thus an apparatus is provided to recover apparatus dropped in water. In experimental tests the pressure sensitive apparatus has actuated in three feet of water. It should be understood that the pressure sensitive apparatus could be mounted to and used to locate any other apparatus dropped in water such as an outboard motor or a tool.

The invention in its broader aspects is not limited to the specific apparatus shown and described but departures may be made therefrom within the scope of the accompanying claims without departing from the principles of the invention and without sacrificing its chief advantages.

I claim:
1. Apparatus for locating a fishing rod dropped into water which comprises:
   a. a housing having an open end mounted to a fishing rod handle;
   b. a hollow member having an opening slidably positioned in the housing;
   c. a resilient diaphragm mounted over the hollow member opening;
   d. a pin mounted to the resilient diaphragm;
   e. spring means for urging the hollow member from the housing open end mounted in and to the housing;

f. a locating strand positioned in the housing and having a locating strand first end connected to the hollow member and a locating strand second end connected to the spring means; and g. a first strand loop mounted to the housing open end and snugly looped over the pin so that when the fishing rod is dropped into water and the pressure increases sufficiently the pin withdraws so that the first strand loop slips off the pin allowing the spring means to eject the hollow member into the water whereupon the hollow member floats to the surface so that the fishing rod may be located and retrieved by pulling in the locating strand.

2. Apparatus for locating a fishing rod dropped into water as recited in claim 1 including the following additional element which comprises:

a. a pin guide having a pin guide hole slidably mounted in the housing with the pin projecting through the pin guide hole.

3. Apparatus for locating a fishing rod dropped into water as recited in claim 1 including the following additional element which comprises:

a. a second strand loop mounted to the housing open end oppositely to the first strand loop and snugly looped over the pin.

4. Apparatus for locating a fishing rod dropped into water as recited in claim 1 wherein the spring means comprises:

a. a spring mounted at one end in the housing to the housing closed end.

5. Apparatus for locating a fishing rod dropped into water as recited in claim 1 including the following additional element which comprises:

a. a breathing plug mounted in the hollow member.

6. Apparatus for locating a fishing rod dropped into water as recited in claim 2 including the following additional element which comprises:

a. a second strand loop mounted to the housing open end oppositely to the first strand loop and snugly looped over the pin.

7. Apparatus for locating a fishing rod dropped into water as recited in claim 2 wherein the spring means comprises:

a. a spring mounted at one end in the housing to the housing closed end.

8. Apparatus for locating a fishing rod dropped into water as recited in claim 2 including the following additional element which comprises:

a. a breathing plug mounted in the hollow member.

9. Apparatus for locating a fishing rod dropped into water as recited in claim 3 wherein the spring means comprises:

a. a spring mounted at one end in the housing to the housing closed end.

10. Apparatus for locating a fishing rod dropped into water as recited in claim 3 including the following additional element which comprises:

a. a breathing plug mounted in the hollow member.

11. Apparatus for locating a fishing rod dropped into water as recited in claim 4 including the following additional element which comprises:

a. a breathing plug mounted in the hollow member.

12. Apparatus for locating a fishing rod dropped into water as recited in claim 2 further comprising:

a. a second strand loop mounted to the housing open end oppositely to the first strand loop and snugly looped over the pin; and b. the spring means comprising a spring mounted at one end in the housing to the housing closed end.

13. Apparatus for locating a fishing rod dropped into water as recited in claim 2 including the following additional elements which comprise:

a. a second strand loop mounted to the housing open end oppositely to the first strand loop and snugly looped over the pin; and b. a breathing plug mounted in the hollow member.

14. Apparatus for locating a fishing rod dropped into water as recited in claim 2 further comprising:

a. a breathing plug mounted in the hollow member; and b. the spring means comprising a spring mounted at one end in the housing to the housing closed end.

15. Apparatus for locating a fishing rod dropped into water as recited in claim 3 further comprising:

a. a breathing plug mounted in the hollow member; and b. the spring means comprising a spring mounted at one end in the housing to the housing closed end.

16. Apparatus for locating a fishing rod dropped into water which comprises:

a. a housing having an open end mounted to a fishing rod handle;

b. a hollow member having an opening slidably positioned in the housing;

c. a breathing plug mounted in the hollow member;

d. a resilient diaphragm mounted over the hollow member opening;

e. a pin mounted to the resilient diaphragm;

f. a pin guide having a pin guide hole slidably mounted in the housing with the pin projecting through the pin guide hole;

g. a spring mounted in the housing to the housing closed end for urging the hollow member from the housing open end;

h. a locating strand positioned in the housing and having a locating strand first end connected to the hollow member and a locating strand second end connected to the spring; and i. a first strand loop and second strand loop oppositely mounted to the housing open end and snugly looped over the pin projecting through the pin guide hole so that when the fishing rod is dropped into water and the pressure increases sufficiently the pin withdraws so that the first strand loop and second strand loop slip off the pin allowing the spring to eject the hollow member into the water whereupon the hollow member floats to the surface so that the fishing rod may be located and retreived by pulling in the locating strand.

17. Apparatus for locating a fishing rod dropped into water as recited in claim 1 including the following additional elements which comprise:

a. the intermediate portion of the locating strand being in the form of a roll;

b. a separator having a separator hole through which the locating strand second end passes being positioned between the spring means and the roll of locating strand so that the locating strand does not get tangled in the spring means.

18. Apparatus for locating a fishing rod dropped into water as recited in claim 2 including the following additional elements which comprise:
   a. the intermediate portion of the locating strand being in the form of a roll;
   b. a separator having a separator hole through which the locating strand second end passes being positioned between the spring means and the roll of locating strand so that the locating strand does not get tangled in the spring means.

19. Apparatus for locating a fishing rod dropped into water as recited in claim 3 including the following additional elements which comprise:
   a. the intermediate portion of the locating strand being in the form of a roll;
   b. a separator having a separator hole through which the locating strand second end passes being positioned between the spring means and the roll of locating strand so that the locating strand does not get tangled in the spring means.

20. Apparatus for locating a fishing rod dropped into water as recited in claim 4 including the following additional elements which comprise:
   a. the intermediate portion of the locating strand being in the form of a roll;
   b. a separator having a separator hole through which the locating strand second end being positioned between the spring and the roll of locating strand so that the locating strand does not get tangled in the spring.

21. Apparatus for locating a fishing rod dropped into water as recited in claim 5 including the following additional elements which comprise:
   a. the intermediate portion of the locating strand being in the form of a roll;
   b. a separator having a separator hole through which the locating strand second end passes being positioned between the spring means and the roll of locating strand so that the locating strand does not get tangled in the spring means.

22. Apparatus for locating a fishing rod dropped into water as recited in claim 6 including the following additional elements which comprise:
   a. the intermediate portion of the locating strand being in the form of a roll;
   b. a separator having a separator hole through which the locating strand second end passes being positioned between the spring means and the roll of locating strand so that the locating strand does not get tangled in the spring means.

23. Apparatus for locating a fishing rod dropped into water as recited in claim 7 including the following additional elements which comprise:
   a. the intermediate portion of the locating strand being in the form of a roll;
   b. a separator having a separator hole through which the locating strand second end passes being positioned between the spring and the roll of locating strand so that the locating strand does not get tangled in the spring.

24. Apparatus for locating a fishing rod dropped into water as recited in claim 8 including the following additional elements which comprise:
   a. the intermediate portion of the locating strand being in the form of a roll;
   b. a separator having a separator hole through which the locating strand second end passes being positioned between the spring means and the roll of locating strand so that the locating strand does not get tangled in the spring means.

25. Apparatus for locating a fishing rod dropped into water as recited in claim 9 including the following additional elements which comprise:
   a. the intermediate portion of the locating strand being in the form of a roll;
   b. a separator having a separator hole through which the locating strand second end passes being positioned between the spring and the roll of locating strand so that the locating strand does not get tangled in the spring.

26. Apparatus for locating a fishing rod dropped into water as recited in claim 10 including the following additional elements which comprise:
   a. the intermediate portion of the locating strand being in the form of a roll;
   b. a separator having a separator hole through which the locating strand second end passes being positioned between the spring means and the roll of locating strand so that the locating strand does not get tangled in the spring means.

27. Apparatus for locating a fishing rod dropped into water as recited in claim 11 including the following additional elements which comprise:
   a. the intermediate portion of the locating strand being in the form of a roll;
   b. a separator having a separator hole through which the locating strand second end passes being positioned between the spring and the roll of locating strand so that the locating strand does not get tangled in the spring.

28. Apparatus for locating a fishing rod dropped into water as recited in claim 12 including the following additional elements which comprise:
   a. the intermediate portion of the locating strand being in the form of a roll;
   b. a separator having a separator hole through which the locating strand second end passes being positioned between the spring and the roll of locating strand so that the locating strand does not get tangled in the spring.

29. Apparatus for locating a fishing rod dropped into water as recited in claim 13 including the following additional elements which comprise:
   a. the intermediate portion of the locating strand being in the form of a roll;
   b. a separator having a separator hole through which the locating strand second end passes being positioned between the spring means and the roll of locating strand so that the locating strand does not get tangled in the spring means.

30. Apparatus for locating a fishing rod dropped into water as recited in claim 14 including the following additional elements which comprise:
   a. the intermediate portion of the locating strand being in the form of a roll;
   b. a separator having a separator hole through which the locating strand second end passes being positioned between the spring and the roll of locating strand so that the locating strand does not get tangled in the spring.

31. Apparatus for locating a fishing rod dropped into water as recited in claim 15 including the following additional elements which comprise:
a. the intermediate portion of the locating strand being in the form of a roll;
b. a separator having a separator hole through which the locating strand second end passes being positioned between the spring and the roll of locating strand so that the locating strand does not get tangled in the spring.

32. Apparatus for locating a fishing rod dropped into water as recited in claim 16 including the following additional elements which comprise:
a. the intermediate portion of the locating strand being in the form of a roll;
b. a separator having a separator hole through which the locating strand second end passes being positioned between the spring and the roll of locating strand so that the locating strand does not get tangled in the spring.

* * * * *